Oct. 13, 1970  R. W. BURNS  3,533,198
ABRASIVE DRUM CONSTRUCTION
Filed Feb. 19, 1968
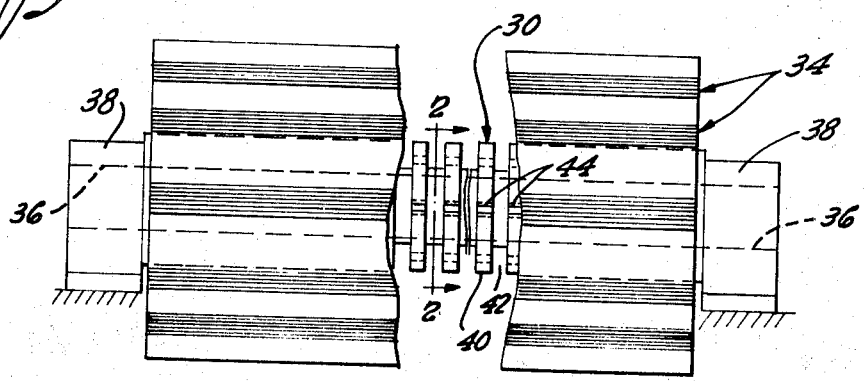
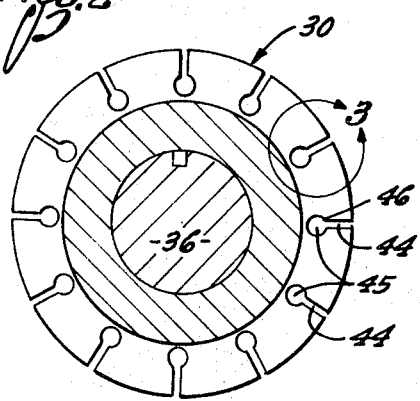
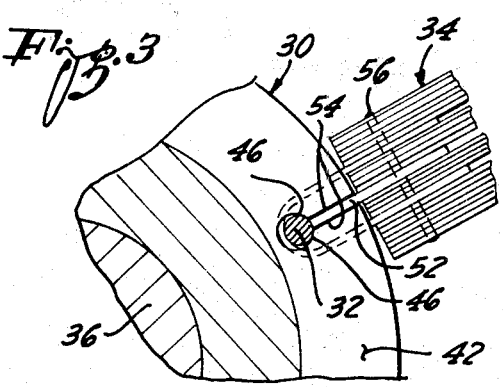
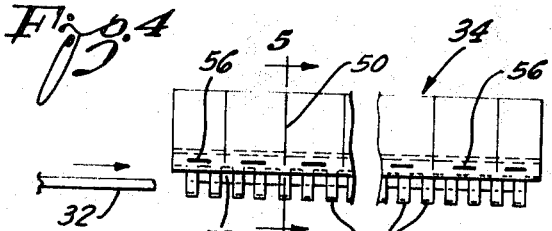
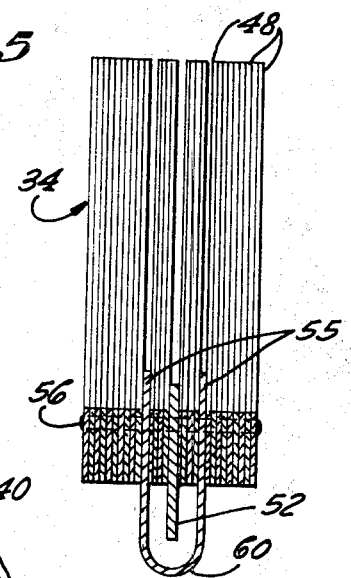
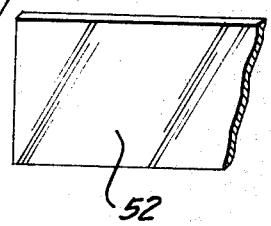
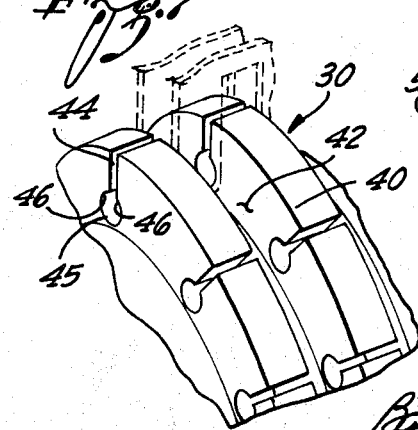
INVENTOR:
Russell W. Burns
ATTORNEYS Oct. 13, 1970   R. W. BURNS   3,533,198
ABRASIVE DRUM CONSTRUCTION
Filed Feb. 19, 1968   3 Sheets-Sheet 2
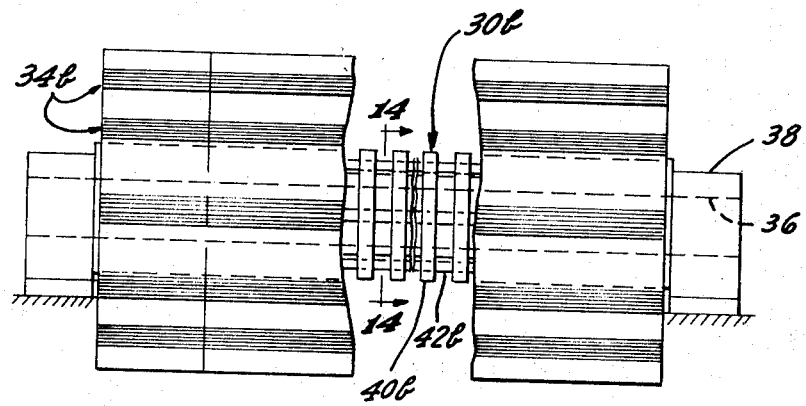
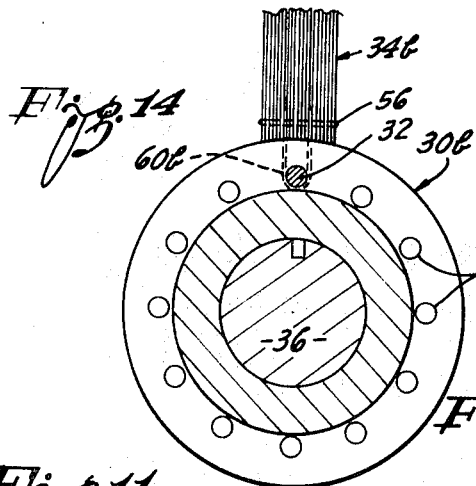
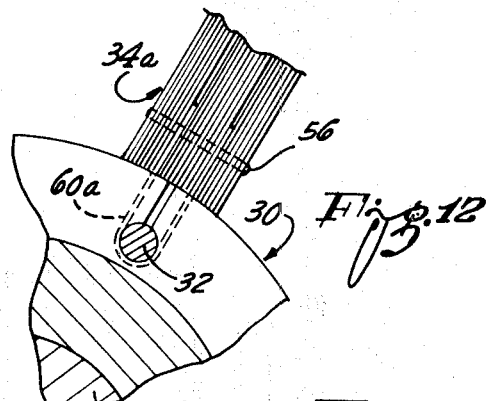
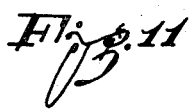
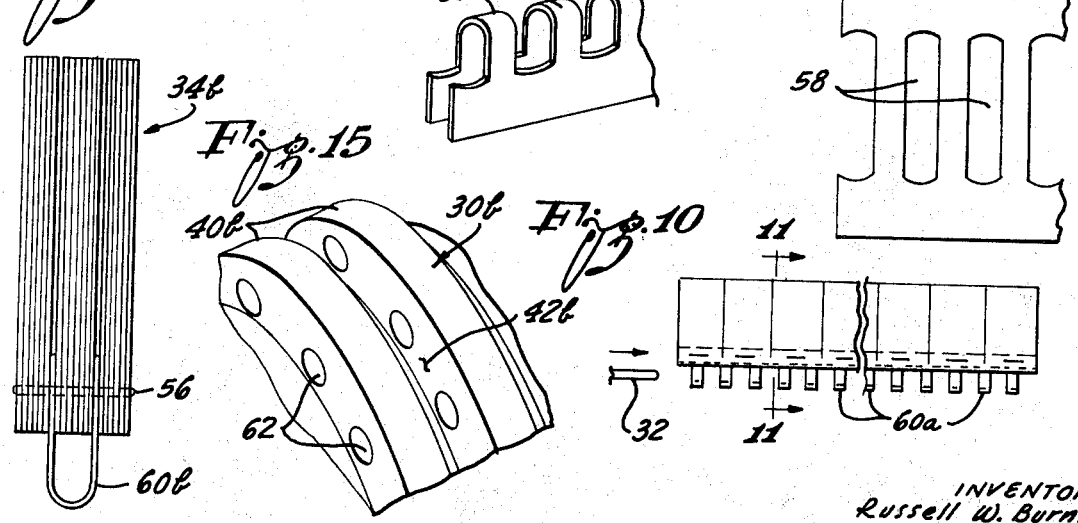
INVENTOR:
Russell W. Burns
ATTORNEYS

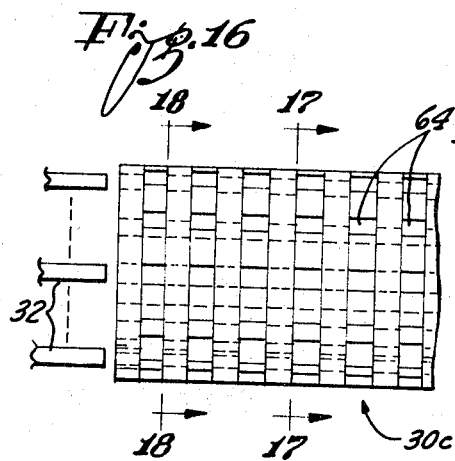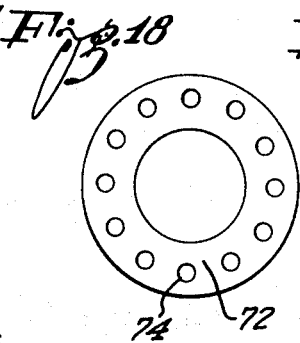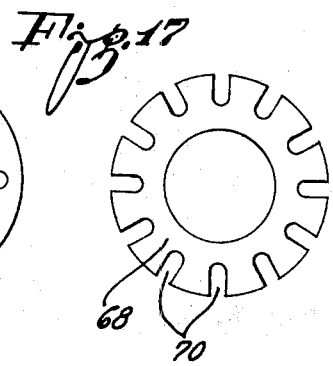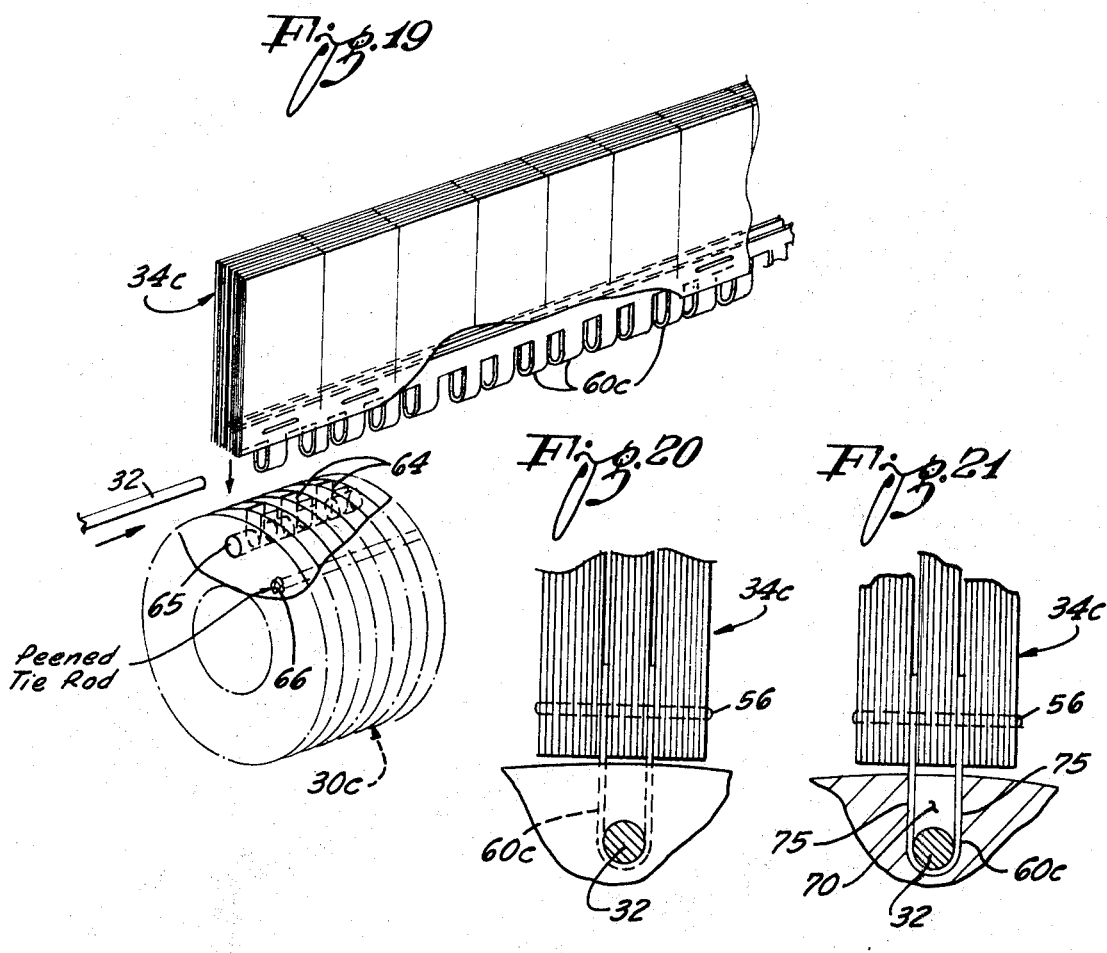

United States Patent Office 3,533,198
Patented Oct. 13, 1970

3,533,198
ABRASIVE DRUM CONSTRUCTION
Russell W. Burns, Pacific Palisades, Calif., assignor, by mesne assignments, to Merit Abrasive Products, Inc., a corporation of California
Filed Feb. 19, 1968, Ser. No. 706,461
Int. Cl. B24b 9/02
U.S. Cl. 51—337
20 Claims

ABSTRACT OF THE DISCLOSURE

An abrasive flap-type drum has a hub of generally cylindrical configuration and longitudinal packs of abrasive sheets are removably mounted on the hub. Each longitudinal pack of abrasive sheets is provided with loop means along its inner longitudinal edge, the loop means comprising sheet material formed to U-shaped cross-sectional configuration with the two legs of the configuration attached to the pack. For the purpose of releasably mounting the longitudinal packs on the cylindrical hub, the cylindrical hub is peripherally recessed to permit the loop means of the packs to extend into the hub and longitudinal passages are provided in the hub to receive retainer rods which extend through the loop means to anchor the packs to the hub.

BACKGROUND OF THE INVENTION

The invention relates to a flap-type abrasive drum with special reference to a drum that is of relatively long axial dimension to be used for abrasively finishing relatively wide surfaces of workpieces. Such a drum has a longitudinal hub of cylindrical configuration on which abrasive segments in the form of longitudinal packs of abrasive sheets are radially mounted.

The present invention is directed to the problem of releasably attaching the packs of abrasive sheets to the drum in an efficient manner that permits ready replacement of worn packs. The disclosure of the Block Patent 3,058,269 entitled "Surface Finishing Drum" meets the problem by providing the longitudinal packs of abrasive sheets with longitudinal anchors and providing the hub with corresponding peripheral slots to receive the anchors. The slots are of keyhole configuration with narrow entrances on the periphery of the drum, the inner ends of the slots being enlarged. The cooperating anchors are of complementary keyhole cross-sectional configuration with enlargements to fit the slot enlargement. To assemble a longitudinal pack of abrasive sheets to the hub, the pack is positioned in end to end relation to the hub and the anchor of the pack is inserted into the end of a keyhole slot to slide the full length of the hub into the desired assembled position.

The disclosed prior art construction provides efficient anchorage for the packs of abrasive sheets and permits replacement of worn packs, but there is need to simplify the replacement procedure. Because the hubs are relatively long, commonly of four foot length, there is a conflict between, on the one hand, the desirability of dimensioning the anchors for snug fit in the keyhole slots for the sake of tight assembly and, on the other hand, the desirability for relatively loose fit to make it easy to slide the anchors lengthwise through the slots.

The present invention avoids this dilemma in that it discloses a method of effectively anchoring a longitudinal pack of abrasive sheets to a hub without the necessity of sliding the anchor portions of the packs longitudinally of the hub.

SUMMARY OF THE INVENTION

The invention permits front loading of the pack of abrasive sheets as distinguished from end loading, i.e. permits a loading procedure in which a pack of abrasive sheets is first positioned longitudinally of the periphery of the hub and then is moved radially of the hub into the desired assembled position. For this purpose, the hub is recessed with liberal tolerance to permit ready entrance of the anchor portions of the packs radially of the hub and the rod-like retainer members are inserted lengthwise of the hub into effective engagement with both the hub and the anchor portions of the packs. Thus the first step of loading a pack from the front of the hub is made easy by the liberal dimensions of the radial recesses that receive the anchor portions of the packs and the retainer rods are both slender and smooth to facilitate their endwise insertion into the hub.

Broadly described, the anchor portions of the longitudinal packs of abrasive sheets in the preferred practice of the invention comprise loop means and the loop means are formed by folding sheet material to U-shaped configuration to form two spaced legs of the sheet material and the two legs of the loop means are suitably attached to the pack of abrasive sheets. While the two legs of the loop means may be attached to the opposite faces of the pack of abrasive sheets, it is advantageous to sandwich each of the two legs between leaves of the pack and to extend fastening means such as staples or rivets through the pack for the dual purpose of interconnecting the leaves of the packs and of anchoring the loop means to the pack.

In the presently preferred practices of the invention, the loop means are made of sheet material and are relatively rigid but the loop means may be made of other materials and need not be rigid. The preferred practices of the invention are further characterized by loop means extending longitudinally of a pack of abrasive sheets in which the loop means is divided into spaced narrow loop elements. A suitable method of fabricating such a loop means is to cut spaced transverse slots in the sheet material before the sheet material is bent to the U-shaped cross-sectional configuration.

The requirement that the hub be constructed to receive the loop elements and to cooperate with the retainer rods is met by providing peripheral recesses in the hub to receive the loop means and by forming longitudinal passages in the hub to receive the retainer rods, the passages forming inwardly overhanging shoulders to prevent radial withdrawal of the retainer rods.

In the first embodiment of the invention the recesses in the periphery of the hub to receive the loop elements are in the form of circumferential grooves separated by circumferential ribs and the ribs are provided with radial keyhole slots. The longitudinal packs of abrasive sheets are provided with relatively rigid longitudinal fins that extend into the radial slots to cooperate with the slots to limit angular divergence of the packs from radial alignment with the slots.

The second embodiment of the invention differs from the first embodiment in the omission of the fins.

In the third embodiment of the invention the fins are omitted from the packs and the circumferential ribs are provided with circumferentially spaced bores which are aligned to form the longitudinal passages.

In the fourth embodiment of the invention the hub has longitudinal rows of peripheral recesses to receive the loop elements of the packs and longitudinal passages intersect the recesses for the insertion of the retainer rods. A feature of the invention is that such a hub structure may be fabricated by arranging two alternate series of disks face-to-face, the disks of one of the two series having peripheral notches to form the peripheral recesses in the hub and the disks of the alternate series having bores therein to form the longitudinal passages for the retainer rods.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a side elevational view of the first embodiment of the invention with portions of the structure broken away;

FIG. 2 is a transverse section of the hub taken as indicated by the line 2—2 of FIG. 1;

FIG. 3 is an enlarged portion of FIG. 2 showing how an abrasive pack is anchored to the hub;

FIG. 4 is an elevational view of one of the elongated packs of abrasive sheets with the spaced loop elements and a fin extending from one longitudinal edge of the pack;

FIG. 5 is an enlarged section taken along the line 5—5 of FIG. 4 to show the structure of a pack;

FIG. 6 is a fragmentary elevational view of a metal plate that forms the longitudinal fin of the pack;

FIG. 7 is a fragmentary perspective view showing how the hub is formed with circumferential ribs separated by circumferential grooves;

FIG. 8 is a fragmentary plan view of a slotted piece of sheet material that is used to form the loop means of a pack of abrasive sheets;

FIG. 9 is a perspective view showing how the piece of slotted sheet material of FIG. 8 is bent to U-shaped cross section to serve as a loop means with spaced narrow loop elements;

FIG. 10 is an elevational view similar to FIG. 4 showing the construction of a longitudinal pack of abrasive sheets that is employed in a second practice of the invention;

FIG. 11 is an enlarged cross section of the pack taken as indicated by the line 11—11 of FIG. 10;

FIG. 12 is a fragmentary sectional view similar to FIG. 3 showing how a pack of abrasive sheets if mounted on the hub in the second embodiment of the invention;

FIG. 13 is a view similar to FIG. 1 illustrating a third embodiment of the invention;

FIG. 14 is an enlarged transverse section on the line 14—14 of FIG. 13;

FIG. 15 is a fragmentary perspective view of the hub of the third embodiment of the invention;

FIG. 16 is a fragmentary elevational view of a hub of a fourth embodiment of the invention which hub may, if desired, be fabricated by assembling together two kinds of disks alternately;

FIG. 17 is a transverse section along the line 17—17 of FIG. 16 showing how the disks of one of the two series of alternate disks may be formed with radial peripheral notches to form the spaced recesses of the hub that receive the loop elements of the packs of abrasive sheets;

FIG. 18 is a transverse section along the line 18—18 of FIG. 16 showing how the disks of the alternate series of disks may be formed with circumferentially spaced bores to receive the retainer rods;

FIG. 19 is a fragmentary perspective view showing a pack of abrasive sheet poised for assembly to the hub shown in FIG. 16;

FIG. 20 is a fragmentary end elevation of the hub and of a pack of abrasive sheets that is mounted on the hub; and FIG. 21 is a sectional view showing how a loop element of the pack of leaves extends into a radial recess in the hub and fits snugly therein to limit angular departure of the pack of abrasive sheets from radial alignment with the hub.

DETAILED DESCRIPTION OF THE EMBODIMENTS OF THE INVENTION

In the first embodiment of the invention shown in FIGS. 1-9, a hub, generally designated 30, of generally cylindrical configuration is made of rigid material and is suitably peripherally recessed and formed with inwardly facing shoulders to cooperate with retainer members in the form of rods 32 (FIGS. 3 and 4) to anchor assemblies or longitudinal packs 34 of flexible abrasive sheets that extend longitudinally of the hub. As indicated in FIGS. 2 and 3, the hub is of tubular configuration to telescope over a shaft 36 and as shown in FIG. 1 the two opposite ends of the shaft 36 are normally journalled in a pair of pillow blocks 38.

As indicated in FIGS. 1 and 7, the periphery of the hub is formed with circumferential ribs 40 that are spaced apart by circumferential grooves 42 and each rib is formed with circumferentially spaced keyhole slots 44, i.e. radial slots which are formed with inner enlargements 45. Each enlargement 45 forms a pair of inwardly facing or inwardly overhanging shoulders 46. The keyhole slots 44 are aligned in rows longitudinally of the hub and each row may be considered as a single longitudinal slot. With the enlargements 45 aligned in rows, the enlargements, in effect, form longitudinal passages in the hub that open on the end of the hub and are dimensioned to receive the retainer rods 32.

Each pack 34 is made up of a plurality of longitudinal abrasive sheets 48 which, in a well known manner, may be made of fabric with abrasive particles bonded to at least one face of the fabric. Preferably, as indicated in FIG. 4, the abrasive sheets 40 have spaced radial slits 50 which divide the sheet into abrasive leaves which are arranged in circumferential rows.

In the first embodiment of the invention, each of the packs 34 is provided with a longitudinal fin 52 which is substantially more rigid than the abrasive sheets. Each of the fins 52 may be in the form of a metal plate as shown in FIG. 6 and as shown in FIG. 3, the fin of a pack extends into the keyhole slots and is confined between opposite walls 54 of the slots to limit angular divergence of the pack from radial alignment with the slot.

Each pack 34 is also provided with loop means for engagement by the corresponding retainer rod 32. Preferably such a loop means is made of suitable sheet material, the sheet material being bent to U-shaped configuration to form a central loop and two legs 55. As shown in FIG. 5, the two legs 55 of a loop means are sandwiched between sheets of the corresponding pack 34. It is contemplated that suitable fastening means will extend through the sheets of the pack and through the fin 52 of the pack as well as through the legs 55 of the loop means for the dual purpose of interconnecting the sheets and of attaching the fin and the loop means to the pack. In this particular embodiment of the invention the fastening means comprises spaced staples 56 as indicated in FIGS. 3, 4 and 5.

It is preferred that the sheet material of the loop means be sheet metal and it is further preferred that the sheet metal is formed in the flap with spaced slots 58 as shown in FIG. 8 so that when the sheet metal is bent to U-shaped configuration as shown in FIG. 9, the resulting loop means will comprise a series of relatively narrow loop elements 60 spaced longitudinally of the corresponding pack of abrasive sheets, the loop elements being spaced apart in accord with the spacing of the circumferential grooves 42 of the hub. When a pack 34 of the abrasive sheets is assembled to the hub 30, the loop elements 60 extend into the corresponding circumferential grooves 42 of the hub and the corresponding retainer rod 32 extends through the corresponding row of keyhole enlargements 45 and through the loop elements 60, the inner shoulders 35 of the slots preventing withdrawal of the retainer rod radially of the hub.

It is apparent that it is a simple matter to mount a longitudinal pack 34 on the hub 30 by first positioning the pack longitudinally of the hub with the loop elements 60 extending into the circumferential grooves 42 and then inserting a retainer rod 32 through the corresponding row of keyhole slots into engagement with the loop elements. When a pack of abrasive sheets is worn out, it is also a simple matter to withdraw the corresponding retainer rod 32 from the end of the hub to free the worn pack.

In a second embodiment of the invention of a construction indicated by FIGS. 10, 11 and 12, the longitudinal fin 52 is omitted from each of the packs 34a of abrasive sheets. To limit angular departure of a pack from radial alignment with the corresponding keyhole slots, i.e. to provide the function of the missing longitudinal fin, the loop elements 60a of the pack are dimensioned to cooperate with the retainer rod 32 to hold the inner longitudinal edge of the pack close to the periphery of the hub 30 as indicated in FIG. 12.

In the third embodiment of the invention illustrated by FIGS. 13, 14 and 15, the hub 30b is formed with circumferential ribs 40b separated by circumferential grooves 42b but the ribs have simple bores or circular apertures 62 instead of keyhole slots, the bores being aligned to form longitudinal passages to receive the retainer rods 32. Here again the loop elements 60b of each pack 34b is dimensioned to cooperate with the corresponding retainer rod 32 to hold the inner longitudinal edge of the pack close to the periphery of the hub as shown in FIG. 14 to limit angular divergence of the pack from radial alignment with the row of bores.

A fourth embodiment of the invention is shown in FIGS. 16–21. As best shown in FIG. 19, the hub 30c is formed with longitudinal rows of peripheral recesses 64 to receive the loop elements 60c of the corresponding packs 34c and the hub is further formed with longitudinal passages as indicated at 65 in FIG. 19, each passage intersecting a row of peripheral recesses and being dimensioned to receive a retainer rod 32.

A feature of the fourth embodiment of the invention is that the hub 30c may be fabricated by assembling two series of disks alternately and then interconnecting the disks, for example by means of peened tie rods, one such tie rod being indicated at 66 in FIG. 19. As shown in FIG. 17 each disk 68 of one of the alternate series of disks is provided with circumferentially spaced radial notches or slots 70 which provide the previously mentioned peripheral recesses 64. As shown in FIG. 18, the disks 72 of the second series of disks are provided with circumferentially spaced bores 74 which are aligned to form the previously mentioned longitudinal passages 65 of the hub. Preferably, as indicated in FIG. 21, each of the notches 70 has parallel opposite side walls 75 and the loop elements 60c of the packs 34c are dimensioned to fit snugly against the two side walls thereby to limit angular departure of the pack from radial alignment with the hub.

My description in specific detail of the selected embodiments of the invention will suggest various changes, substitutions and other departures from my invention within the spirit and scope of the appended claims.

I claim:

1. In an abrasive drum having a series of longitudinal assemblies of flexible abrasive sheets mounted on a rigid hub, wherein the hub is formed with longitudinal rows of peripheral recesses with the recesses in each row interconnected by a longitudinal passage, the improvement for releasably anchoring the assemblies to the hub, comprising:

each of said assemblies having a series of longitudinally spaced loop elements extending inwardly from its inner longitudinal edge for positioning respectively in the recesses of a row of said recesses; and a plurality of elongated retainer members corresponding to the series of assemblies to extend retractibly through said longitudinal passages and through said loop elements to anchor the assemblies to the hub.

2. An improvement as set forth in claim 1 in which the loop elements are relatively stiff and the surfaces of the peripheral recesses confine the loop elements from opposite sides thereof to cooperate with the loop elements to limit angular departure of the asemblies from radial alignment relative to the hub.

3. An improvement as set forth in claim 1 in which said hub comprises a first series of disks and a second series of disks alternating with the disks of the first series, one of said series of disks having peripheral notches forming the longitudinal rows of spaced peripheral recesses, the other of said series of disks having circumferentially spaced apertures therein forming the passages that interconnect the recesses of the rows of recesses.

4. In an abrasive drum, the combination of:

a hub of rigid material formed with a series of peripheral circumferential ribs separated by grooves, each of said ribs having a series of circumferentially spaced openings therein, said openings being aligned in a series of rows extending longitudinally of the hub;

a circumferential series of spaced assemblies of abrasive sheets corresponding to said series of rows and positioned longitudinally of the hub, each assembly having longitudinally spaced anchoring elements extending into the grooves of the hub along one of said rows; and elongated retainer members extending through said rows of openings respectively in engagement with both said ribs and said anchoring means to secure the assemblies to the hub.

5. A combination as set forth in claim 4 in which said anchoring elements extend around the retainer members.

6. A combination as set forth in claim 4 in which members of sheet material of U-shaped cross-sectional configuration with two spaced legs are slotted in the middle of the U-shaped configuration to form said spaced anchoring elements.

7. An abrasive pack adapted for installation in a rotatable mandrel which has a peripheral surface and an opening extending inwardly through the peripheral surface, the abrasive pack being constructed to be pressed against a workpiece when the mandrel is rotated, the pack comprising:

a plurality of sheets disposed against one another in a form in which each includes a base portion and a work contact portion and a base edge defining the inner edges of the base portion, retainer means having at least one looped portion with two opposite ends, the looped portion constituting a holding portion with a length and dimensions to fit into the opening in the mandrel and to retain the retainer means in the opening in the mandrel, a stabilizing fin disposed between the two opposite ends of the looped portion of the retainer means and extending inwardly from the base edge o fthe sheets in the plurality, and means fixedly attaching the base portions of the sheets in the plurality and the stabilizing fin and the opposite ends of the looped portion of the retainer means.

8. The abrasive pack set forth in claim 7 wherein first sheets in the plurality are disposed between the stabilizing fin and each of the two opposite ends of the looped portion of the retainer means and wherein additional sheets in the plurality are disposed adjacent at least one of the two opposite ends of the looped portion of the retainer means on the far side of the other one of such two opposite ends.

9. The abrasive pack set forth in claim 7 wherein the sheets terminate at the base edges at a position in which the base edges will abut the peripheral surface of the mandrel to brace the sheets against the mandrel for limiting any rocking motion of the looped portion of the retainer means when the mandrel is rotated and the pack is pressed against the workpiece.

10. The abrasive pack set forth in claim 7 wherein the looped portion of the retainer means is interrupted at spaced intervals along the base edges of the sheets.

11. The abrasive pack set forth in claim 7 wherein the attaching means are disposed at a position outwardly from the peripheral surface of the mandrel when the abrasive pack is disposed with the looped portion of the retainer means in the opening of the mandrel.

12. In an abrasive drum having a series of packs of flexible abrasive sheets mounted longitudinally on an axial hub, said packs being circumferentially spaced around said hub, an improved construction for holding said packs in substantially radical alignment, and releasably anchoring them to said hub, comprising:

each of said packs being an assembly of longitudinally extended abrasive sheets extending generally radially from said hub, all the sheets of said pack having base edges adjacent said hub, said base edges being joined to form a base adapted to abut the surface of said hub;

an attachment loop comprised of a folded sheet disposed longitudinally of each of said packs under said base thereof, with said fold projecting inwardly toward the axis of said hub and said folded sheet having two longitudinal edges projecting radially outwardly into said assembly of abrasive sheets, said folded sheet edges being anchored in said assembly adjacent to the base edges of said sheets;

outer walls in said hub defining a substantially cylindrical seating surface for seating of said bases of said packs;

outer walls in said hub defining openings into said hub, inwardly from said cylindrical seating surface, to accommodate said folded edge of said sheet when said packs are in position with their bases on said cylindrical seating surface;

and retainer rod means receiving in said hub through longitudinal passages therein, said passages being circumferentially spaced around said hub in correspondence with said packs, said rods passing through said loops at a radial location inward of said seating surface to hold the base of said pack close to said cylindrical seating surface to limit angular divergence of said pack from radial alignment.

13. In an abrasive drum having a series of packs of flexible abrasive sheets mounted longitudinally on an axial hub, said packs being circumferentially spaced around said hub, an improved construction for holding said packs in substantially radial alignment, and releasably anchoring them to said hub, comprising:

each of said packs being an assembly of longitudinally extended abrasive sheets, each of said sheets having an outer wearing edge and an inner base edge, all the sheets of said pack being joined to each other near said base edges to form a pack freely opening at said outer wearing edges, with said inner edges forming a compact base adapted to abut the surface of said hub;

an attachment loop comprised of a folded sheet disposed longitudinally of each of said packs under said base thereof, with said fold projecting inwardly toward the axis of said hub and said folded sheet having two longitudinal edges projecting radially outwardly into said assembly of abrasive sheets, said folded sheet edges being anchored in said pack adjacent to the base edges of the abrasive sheets thereof, said folded sheet having spaced notches at said fold to provide longitudinally extending loops at spaced intervals, alternating with longitudinally extended exposed portions of the base of said pack;

outer walls in said hub defining a substantially cylindrical seating surface for seating of said exposed base portions of said packs;

outer walls in said hub defining openings into said hub, inwardly from said cylindrical seatng surface to accommodate sad longitudinally extended loops when said packs are in position with their bases on said cylindrical seating surface;

and retainer rod means received in said hub through longitudinal passages therein, said passages being circumferentially spaced around said hub in correspondence with said packs, each of said rod means passing through the loops of one of said packs at a radial location inward of said seating surface to hold the base of said pack close to said cylindrical seating surface to limit angular divergence of said pack from radial alignment.

14. An abrasive drum as set forth in claim 13 in which:

said outer walls of said hub are formed with alternate annular shoulders and annular grooves, said annular shoulders having an axial length corresponding to said longitudinally extended exposed portion of the bases of said packs and providing said cylindrical seatng surface for said packs;

said annular grooves having an axial length corresponding to said longitudinally extended loops of said folded sheet, and a depth to accommodate said longitudinally extended loops when said packs are seated on said annular shoulders;

and said annular shoulders having said longitudinal passages for the accommodation of said retainer rod means.

15. An abrasive drum as set forth in claim 13 in which said folded sheet is made of rigid sheet metal.

16. An abrasive drum as set forth in claim 13 in which said folded sheet is made of a non-rigid, non-metallic material.

17. An abrasive drum as set forth in claim 13 in which:

said outer walls of said hub are formed with alternate annular shoulders and annular grooves, corresponding in axial length to said spaced notches and loops in said folded sheets, respectively;

and each of said annular shoulders has circumferentially spaced radial slots around the periphery, said slots being in axial alignment with each other and each line of slots corresponding to the seating surface of one of said packs; and each of said packs is provided with a radially inward projecting rigid longitudinal fin accommodated within one of said axially extending line of slots.

18. An abrasive drum as set forth in claim 13 in which:

said hub is comprised of an assembly of coaxial cylinders, a first set of alternate cylinders of relatively larger diameter having a common cylindrical outer surface to provide said seating surface for said packs; and a second set of alternate cylinders of relatively smaller diameter providing the recesses for said longitudinally extended loops of said folded sheet; said longitudinal passages for said retainer rods extending through said larger diameter cylinders near the periphery thereof, but outboard of said smaller diameter cylinders; and said cylinders being locked in assembly to maintain said retainer rod passages in alignment.

19. An abrasive drum as set forth in claim 13 in which:

said hub is comprised of a series of coaxial cylinders having a common cylindrical outer surface, and in which alternate cylinders have peripheral notches forming a line of notches on the cylindrical surface of said hub corresponding to each of said packs, and snugly accommodating said spaced loops.

20. An abrasive drum as set forth in claim 13, in which said folded sheet is made of rigid sheet metal, and said openings into said hub have axially disposed walls snugly engaging the longitudinal sides of said loop to limit the angular departure of the pack from radial alignment with said hub.

References Cited

UNITED STATES PATENTS

| | | | |
|---|---|---|---|
| 2,843,980 | 7/1958 | Bernstein et al. | 51—337 |
| 2,871,632 | 2/1959 | Cosmos | 51—337 |
| 3,058,269 | 10/1962 | Block | 51—337 |
| 3,455,068 | 7/1969 | Belanger | 51—337 |

OTHELL M. SIMPSON, Primary Examiner

U.S. Cl. X.R.

15—183

Notice of Adverse Decisions in Interferences

In Interference No. 98,061 involving Patent No. 3,533,198, R. W. Burns, ABRASIVE DRUM CONSTRUCTION, final judgment adverse to the patentee was rendered June 19, 1973, as to claims 4 and 5.

[*Official Gazette October 23, 1973.*]